F. A. G. PIRWITZ.
GAUGING AND MEASURING INSTRUMENT.
APPLICATION FILED DEC 30, 1919.
1,424,941.
Patented Aug. 8, 1922.
2 SHEETS—SHEET 2.
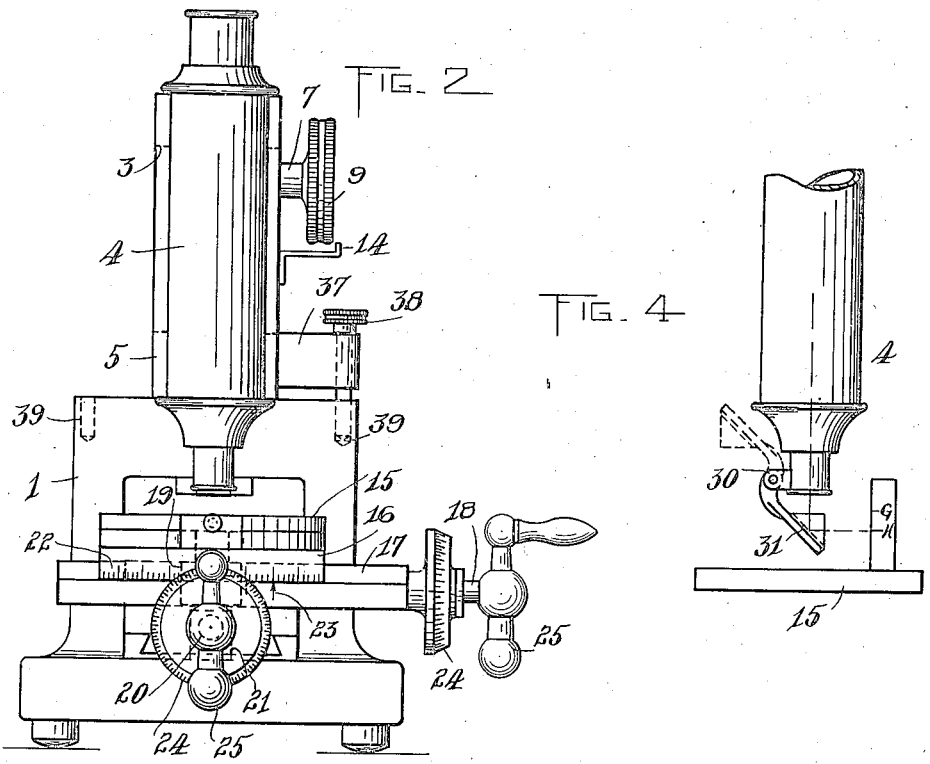
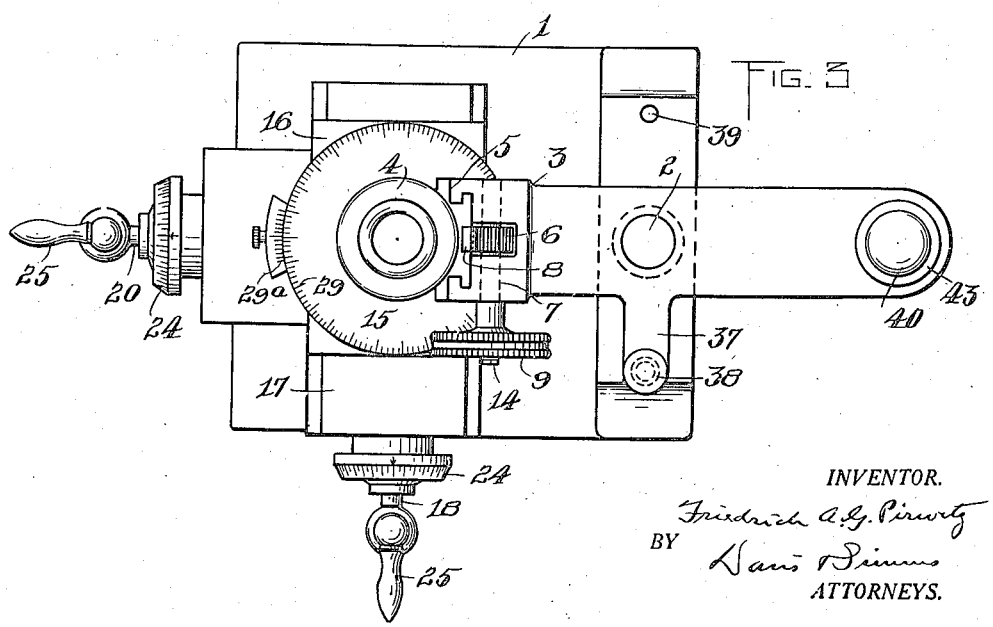
INVENTOR.
Friedrich A. G. Pirwitz
BY
ATTORNEYS.

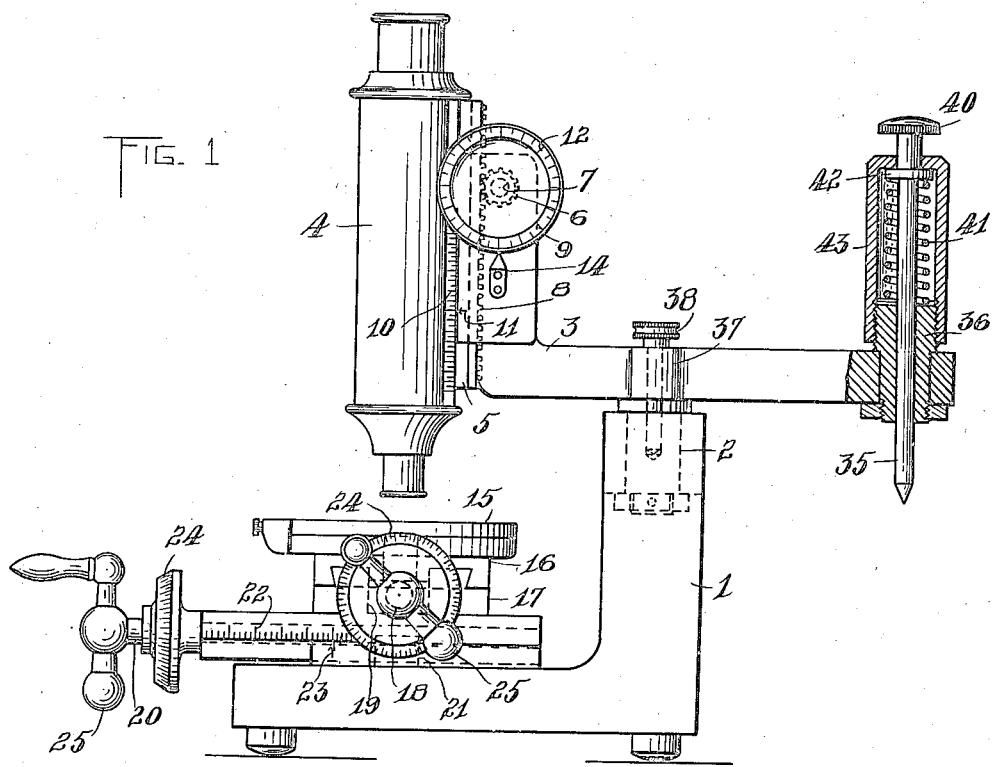

UNITED STATES PATENT OFFICE.

FRIEDRICH A. G. PIRWITZ, OF ROCHESTER, NEW YORK.

GAUGING AND MEASURING INSTRUMENT.

1,424,941.

Specification of Letters Patent. Patented Aug. 8, 1922.

Application filed December 30, 1919. Serial No. 348,341.

*To all whom it may concern:*

Be it known that I, FRIEDRICH A. G. PIRWITZ, a citizen of the United States, and resident of Rochester, in the county of Monroe and State of New York, have invented certain new and useful Improvements in Gauging and Measuring Instruments, of which the following is a specification.

The present invention relates to devices for accurately gauging and measuring articles produced by mechanical operations to ascertain if their dimensions vary from a certain standard; and it more specifically relates to that class of instruments employing a microscope to enable any error to be ascertained and measured with the utmost precision.

The invention has for an object to produce such an instrument by which the distance apart of points on an object in the same plane can be readily measured by manipulation of correlated and separately adjustable sliding supports for a table on which the object rests. A further object is to enable the measurement of vertical heights on the object. A still further object is to provide means whereby the work can be accurately marked for laying out centers for drilling holes or performing other machining operations.

In the drawings:

Fig. 1 is a side elevation of a measuring and testing device constructed in accordance with my invention;

Fig. 2 is a front elevation thereof;

Fig. 3 is a plan view;

Fig. 4 is a view showing the manner in which vertical distances on the object are tested;

Fig. 5 is a plan view of an object, showing how adjustments thereof may be made when the polar coordinates of a point are given;

Fig. 6 is a similar view, showing the adjustments necessary when the rectangular coordinates are given;

Fig. 7 is a view showing the arrangement of the indicating marks on a lens of the microscope.

The form of the invention illustrated in the drawings embodies a support 1 of substantially L shaped vertical section, having secured thereto a bracket 3 which carries a microscope 4, vertically adjustable in guides 5 by means of a pinion 6 on a shaft 7 meshing with a rack 8 on the microscope tube. The shaft 7 is revolved by a thumb piece 9 to raise and lower the microscope, the length of movement thereof being indicated by a scale 10 cooperating with an index 11 and still smaller distances as given by graduations 12 on the thumb piece cooperating with an index 14 on the bracket 3.

The object A to be tested or measured is carried by a table 15 beneath the microscope, the table preferably being pivotally mounted about a vertical axis on a member 16 which is horizontally movable upon a member 17 by a mechanism comprising an adjusting screw 18 carried by the member 17 and engaging a nut 19 on the member 16. The member 17 is in turn horizontally movable upon the base 1 in a direction at right angles to that of the member 16 by means of an adjusting screw 20 engaging a nut 21 on the base. The distances that the members 16 and 17 are adjusted are indicated by an indicating means comprising in this instance, scales 22 on the slides cooperating with indexes 23 and the finer subdivisions are shown by the micrometer dials 24. Handles 25 on the screws 18 and 20 permit their ready adjustment.

In order to describe the manner in which the device may be used, reference is made to Fig. 5 which shows an object A having two holes C and D therein different distances from the center B. Assume that the angle between the lines from the center B to the centers of the two holes, and the distances of the holes from the center are known. The object is fixed in position on the table 15 in such a position that the center B is at the center of the field of vision of the microscope when the indexes 23 are at the zero graduation on their respective slides. In other words, the axis of the table and microscope are coincident. The axis is indicated by the usual cross hairs or etched lines 26 and 27 of the microscope, and correct positioning of the object may be verified by rotating the table about its axis. If this rotation does not cause an apparent shifting of the center B of the object, the position of the object on the table is correct. The slide 16 is next adjusted a distance corresponding to that which the distance D B on the object is supposed to equal, and the table turned to bring the center of D on the cross hair 26. If the distance D B is correct the center D will then fall on the intersection of 26 and 27. If not correct, the amount of error is indicated by its position with reference to one of a plurality of concentric circles 28 appearing on a lens of the microscope.

The table is now rotated through the angle which it is assumed the lines C B and D B include, the edge of the table having graduations as shown at 29 cooperating with an index 29ᵃ on the slide 16 for indicating the angle through which the table is adjusted. The slide 16 is also adjusted until the displacement from zero corresponds to the theoretical distance between B and C. If the angle and this distance are correct the center of hole C will fall at the intersection of the cross hairs. If there is an error in the angle the hole will appear to one side of the line 26. If the distance C B is incorrect and the angle correct, the hole will appear on the line 26 but not at the intersection of the line 27. The remoteness from the point of intersection will of course correspond with the amount of error, and the circles 28 may be made of such diameter as to show the magnitude of the error in any desired unit.

In case the rectangular coordinates of the point C are given, the slide 16 may first be moved the length of the abcissa E B and the slide 17 then moved the length of the ordinate E C any error appearing as below.

To measure the vertical distances between points on the object, the lower end of the tube of the microscope carries a bracket 30, and pivoted thereto is a prism having a reflecting surface 31 arranged at an angle of 45° to the axis of the microscope. It is obvious that the distance between points G and H of an object (Fig. 4) can be measured or tested by a vertical adjustment of the microscope tube as a whole, the distance the latter is raised appearing on the scale 10 and dial 13.

The instrument can also be used to mark centers for drilling by substituting, for the microscope, a center punch 35. This punch is preferably of the construction shown in Fig. 1, being in the form of a rod having a knob 40 at its upper end and a conical point at its lower end. The rod is surrounded by a spring 41 which thrusts at its lower end against the bushing 36 carried by the bracket 3 and at its upper end bears against a shoulder 42 on the rod. The upward motion is limited by engagement of the shoulder 42 with the end of a sleeve 43 that incloses the spring and has threaded connection with the bushing 36 whereby the tension of the spring may be varied as desired. The bracket 3 which carries the punch 35 and the microscope is movable preferably to swing about a vertical axis 2. The bracket 3 also carries an arm 37 in which slides a locking pin 38, adapted to enter either of two holes 39, according to whether the microscope or center punch is located over the table. The axis of both the microscope and center punch are the same distance from the pivotal axis 2 so that they can both be brought to exactly the same location with reference to the table 15 and locked in position by the locking pin 37.

It will be readily understood that a center mark may be made on the work piece any desired distance from another point on the object, by first positioning the point under the microscope in registration with the cross hairs and then adjusting one or both slides the requisite amount to move the object the distance desired. The microscope is then swung out of the way and the center punch swung into position and the bracket locked. Inasmuch as the center punch now occupies the position before occupied by the microscope, it will be apparent that the punch is in the proper location to correctly mark the work.

What I claim as my invention and desire to secure by Letters Patent is:

1. In a testing and marking apparatus, the combination with a support, and a work table adjustable on the support, of a microscope, movably mounted on the support, above the work table, a tool also movably mounted on the support, and means for locking either the tool or the microscope in the same fixed position relative to the support.

2. In a testing and marking apparatus, the combination with a support, and a work table adjustable on the support, of a bracket pivotally mounted on the support, a microscope and a marking tool carried by the bracket, and means for locking the bracket so that either the microscope or the marking tool occupies the same fixed position relative to the support.

3. In a testing and marking apparatus, the combination with a support, and a work table adjustable on the support, of a bracket pivotally mounted on the support, a microscope and a marking tool both movable in a direction parallel with the pivotal axis of the bracket, toward the work table, and means for locking the bracket so that either the microscope or the marking tool occupies the same fixed position relative to the support.

4. In a testing apparatus, the combination with a support, and a microscope carried thereby, the microscope having cross lines and concentric circles appearing in the field of vision, of a work table, and means for supporting said work table so that it can be moved relatively to the microscope transversely of the optical axis of the microscope in either of two directions to position a certain point of a work piece fixed on the table, within the field of vision of the microscope and means for effecting a relative movement between the microscope and the work table in the direction of the optical axis of the microscope for the purpose of obtaining a varied magnification.

5. In a testing apparatus, the combination with a support and a microscope carried thereby, the microscope having cross lines and concentric circles appearing in the field of vision, of a slide movable on the support relatively to the microscope in one direction transversely of the optical axis of the microscope, a second slide movable on the first named slide in another direction transversely of the optical axis of the microscope, and a work table mounted on the second slide and movable relatively to the microscope in either or both of two directions to position a certain point of an object carried thereby, within the field of vision of the microscope and means for effecting a relative movement between the microscope and the work table in the direction of the optical axis of the microscope to obtain a varied magnification.

6. In a testing apparatus, the combination with a support and a microscope carried thereby, the microscope having cross lines and concentric circles appearing in the field of vision, a work table, and compound slides carrying the work table so that it has a rectilinear motion, relatively to the microscope transversely of the optical axis of the latter and also an angular motion whereby the table can be moved to position a certain point of a work piece fixed thereon, within the field of vision of the microscope.

7. In a testing apparatus, the combination with a support and a microscope carried thereby, the microscope having cross lines and concentric circles appearing in the field of vision, of a work table movable on the support relatively to the microscope transversely of the optical axis of the latter, and means for moving the table a definite distance in a certain direction to position a certain point of an object on the work table, in the field of vision.

8. In a testing apparatus, the combination with a support and a microscope carried thereby, the microscope having cross lines and concentric circles appearing in the field of vision, of a slide movable on the support relatively to the microscope in one direction transversely of the optical axis of said microscope, a second slide movable on the first slide relatively to the microscope in another direction transversely of the optical axis of the microscope, and a work table angularly adjustable on the second slide transversely of the optical axis of the microscope and movable beneath the microscope to position a certain point of an object carried thereby, within the field of vision of the microscope.

9. In a testing apparatus, the combination with a support and a work table carried thereby, of a microscope also mounted on the support, a reflector carried by the microscope and arranged at an angle to the axis thereof above the table, adjusting means for moving the microscope and the reflector axially toward and from the work table, and means for indicating the amount of such motion.

10. In a testing apparatus, the combination with a microscope having in its field of vision a scale, a work support, means for supporting said work support so that it may be moved relatively to the microscope transversely of the optical axis of the microscope in either of two directions to a certain point of a work piece on the table within the field of vision of the microscope, and means for determining the position of the work support and means for effecting a relative movement between the microscope and the work support in the direction of the optical axis of the microscope.

FRIEDRICH A. G. PIRWITZ.